United States Patent
Ballard

(10) Patent No.: US 7,740,068 B2
(45) Date of Patent: Jun. 22, 2010

(54) SILICATE-BASED WELLBORE FLUID AND METHODS FOR STABILIZING UNCONSOLIDATED FORMATIONS

(75) Inventor: David Antony Ballard, Stonehaven (GB)

(73) Assignee: M-I LLC, Houston, TX (US)

( * ) Notice: Subject to any disclaimer, the term of this patent is extended or adjusted under 35 U.S.C. 154(b) by 224 days.

(21) Appl. No.: 12/019,332

(22) Filed: Jan. 24, 2008

(65) Prior Publication Data

US 2008/0190614 A1    Aug. 14, 2008

Related U.S. Application Data

(60) Provisional application No. 60/888,971, filed on Feb. 9, 2007.

(51) Int. Cl.
 E21B 33/138   (2006.01)
 C09K 8/516    (2006.01)
 C09K 8/575    (2006.01)

(52) U.S. Cl. .............. 166/294; 106/633; 106/634; 106/636; 166/292; 166/300; 507/269; 507/906

(58) Field of Classification Search ........... 106/636; 507/906

See application file for complete search history.

(56) References Cited

U.S. PATENT DOCUMENTS

| | | | | |
|---|---|---|---|---|
| 2,165,823 | A | * | 7/1939 | Vietti et al. ............ 507/145 |
| 2,807,324 | A | * | 9/1957 | King et al. ............. 166/292 |
| 3,097,694 | A | * | 7/1963 | Kerver ................. 166/280.1 |
| 3,146,828 | A | * | 9/1964 | Mann ..................... 166/276 |
| 3,146,829 | A | * | 9/1964 | Mann ..................... 166/276 |
| 3,593,796 | A | | 7/1971 | Stainback et al. |
| 3,741,308 | A | | 6/1973 | Veley |
| 4,291,766 | A | | 9/1981 | Davies et al. |
| 4,427,069 | A | | 1/1984 | Friedman |
| 4,505,751 | A | | 3/1985 | Sydansk |
| 4,541,485 | A | | 9/1985 | Block |
| 4,669,543 | A | | 6/1987 | Young |
| 4,669,919 | A | | 6/1987 | Hilterhaus et al. |
| 4,697,961 | A | | 10/1987 | De Boodt et al. |
| 4,799,549 | A | | 1/1989 | Vinot et al. |
| 4,891,072 | A | | 1/1990 | Cooper et al. |
| 4,902,170 | A | | 2/1990 | Knox et al. |
| 5,088,555 | A | | 2/1992 | Shu |
| 5,091,447 | A | | 2/1992 | Lomasney |
| 5,101,901 | A | | 4/1992 | Shu et al. |
| 5,199,492 | A | | 4/1993 | Surles et al. |
| 5,209,297 | A | | 5/1993 | Ott |
| 5,361,842 | A | | 11/1994 | Hale et al. |
| 5,401,719 | A | | 3/1995 | DeBeer et al. |
| 5,431,728 | A | * | 7/1995 | Frouin et al. ........... 106/612 |
| 5,806,593 | A | | 9/1998 | Surles |
| 6,107,368 | A | | 8/2000 | Roland et al. |
| 6,152,227 | A | | 11/2000 | Lawson et al. |
| 6,248,698 | B1 | | 6/2001 | Mullen et al. |
| 6,258,756 | B1 | | 7/2001 | Hayatdavoudi |
| 6,390,197 | B1 | | 5/2002 | Maroy et al. |
| 6,703,351 | B2 | | 3/2004 | Stowe, II et al. |
| 6,889,780 | B2 | | 5/2005 | Whitfill et al. |
| 6,897,186 | B2 | | 5/2005 | Goodhue, Jr. et al. |
| 7,137,459 | B1 | | 11/2006 | Dearing, Jr. |

FOREIGN PATENT DOCUMENTS

GB     953991     4/1964

OTHER PUBLICATIONS

PCT International Search Report issued in PCT Application No. PCT/US2008/053388 dated Aug. 6, 2008 (3 pages).
PCT Written Opinion issued in PCT Application No. PCT/US2008/053388 dated Aug. 6, 2008 (3 pages).
Extended European Search Report for European Application No. 08729360.1-1218, mailed on Feb. 9, 2010 (7 pages).

* cited by examiner

*Primary Examiner*—George Suchfield
(74) *Attorney, Agent, or Firm*—Osha • Liang LLP

(57) ABSTRACT

A method for treating a subterranean formation penetrated by a wellbore that includes injecting an alkali silicate into the wellbore; injecting a solid micronized silicate-precipitating agent into the wellbore; and allowing the alkali silicate and the solid micronized silicate-precipitating agent to react to form a silicate gel is disclosed.

5 Claims, No Drawings

SILICATE-BASED WELLBORE FLUID AND METHODS FOR STABILIZING UNCONSOLIDATED FORMATIONS

CROSS-REFERENCE TO RELATE APPLICATIONS

This application, pursuant to 35 U.S.C. §119(e), claims priority to U.S. Patent Application Ser. No. 60/888,971, filed on Feb. 9, 2007, which is herein incorporated by reference in its entirety.

BACKGROUND OF INVENTION

1. Field of the Invention

Embodiments disclosed herein relate generally to wellbore fluids that may include silicate-based additives for stabilizing an unconsolidated formation.

2. Background Art

Hydrocarbon fluids, such as oil and natural gas, and other desirable formation fluids are obtained from a subterranean geologic formation, i.e., a reservoir, by drilling a well that penetrates the formation zone that contains the desired fluid. Once a wellbore has been drilled, the well must be completed. A well "completion" involves the design, selection, and installation of equipment and materials in or around the wellbore for conveying, pumping, or controlling the production or injection of fluids. After the well has been completed, production of the formation fluids can begin.

When the subterranean formation is "soft" or poorly consolidated, small particulates (typically sand) present in the formation may dislodge and travel along with the produced fluid to the wellbore. Production of sand is highly undesirable as it tends to cause erosion of surface and subterranean equipment, and therefore, it must be removed from the produced fluids before they can be processed. In addition, the migrating sand can plug the flow channels in the formation, thereby necessitating other stimulation techniques, such as acid stimulation, to restore the well's performance.

Various types of unconsolidated formations include dune sands, alluvial deposits of sand and gravel, and unconsolidated marine deposits. The challenges in drilling and completing wells in these types of formations are to keep the borehole open and prevent caving, and to avoid reducing the hydraulic conductivity of the near-well formation by introducing irrecoverable mud or smearing clay at the well/aquifer interface during the drilling process. Drilling fluids for unconsolidated formations are typically water-based and generally include clean fresh water, water with clay additives, water with polymeric additives and water with a mixture of clay and polymeric additives.

One method of controlling loose sands in unconsolidated formations involves placing a filtration bed of gravel near the wellbore in order to present a physical barrier to the transport of unconsolidated formation fines with the production of hydrocarbons. Typically, such so-called "gravel packing operations" involve the pumping and placement of a quantity of a desired particulate into the unconsolidated formation adjacent the wellbore. Such packs are time consuming and expensive to install.

Another method used to control loose sands in unconsolidated formations involves consolidating or stabilizing the unconsolidated subterranean producing zones into hard permeable masses by pre-flushing the formation, applying a hardenable resin composition, applying a spacer fluid, applying an external catalyst to cause the resin to set, and applying an afterflush fluid to remove excess resin from the pore spaces of the zones. Such multiple-component applications, however, often result in uncertainty and create a risk for undesirable results. For example, when an insufficient amount of spacer fluid is used between the application of the hardenable resin and the application of the external catalyst the resin may come into contact with the external catalyst in the wellbore itself rather than in the unconsolidated subterranean producing zone. When resin is contacted with an external catalyst an exothermic reaction occurs that may result in rapid polymerization. The polymerization may damage the formation by plugging the pore channels, may halt pumping when the wellbore is plugged with solid material, or may even result in a downhole explosion as a result of the heat of polymerization. Also, using these conventional processes to treat long intervals of unconsolidated regions is not practical due to the difficulty in determining if the entire interval that has been treated with both the resin and the activation agent.

These techniques typically involve the injection of a consolidating fluid, such as a resin-based consolidating fluid, through the wellbore and into the formation surrounding the interval of interest. Resin-based consolidating fluids generally include an organic resin, a curing agent, a catalyst and an oil wetting agent. The resin system hardens in the formation, thereby consolidating it. Examples of such resin-based consolidating fluids and methods for using them are described in, for example, U.S. Pat. Nos. 4,291,766; 4,427,069; 4,669,543; 5,199,492; and 5,806,593. Resin-based consolidation systems may be complicated to apply, especially those involving multiple treatment stages, and the treatment results may be erratic. When the individual components of the consolidating fluid are pumped at different stages into the formation they may or may not come together in the right order, or in the right amounts, or they may not even come together at all. And, even when they do come together, good mixing of the components is not assured, helping to explain the erratic and unreliable results that operators have experienced using such multistage consolidating fluids.

In an effort to improve performance, other well treatments have been proposed which use inorganic systems, specifically the use of components which form silica gels, to modify the formation and thereby reduce the production of formation fines. For example, U.S. Pat. No. 3,593,796 describes a multi-stage process in which the following components are injected sequentially into the formation: (1) an aqueous solution containing a silicate adapted to wet the fine sand grain particles, (2) an aqueous solution of a silicate-precipitating agent capable of reacting with the silicate in solution (1) so as to form a solidifying material and therein to bind the fine sand grain particles, and (3) a solution containing an oil-wetting agent. This treatment is designed to immobilize the fine particles in the formation and prevent their migration when subjected to subsequent fluid flow. The patent states that aqueous solutions of alkaline earth metal salts (e.g., calcium chloride), acidic iron salts, and certain other metal salts can be used as the silicate-precipitating agent.

In another instance, U.S. Pat. No. 3,741,308 describes a method of converting an unconsolidated sand formation into a consolidated, permeable formation by flowing volumes of aqueous calcium hydroxide (or compounds which hydrolyze or react with each other to form calcium hydroxide) through the pores of the unconsolidated formation. The patent states that the calcium hydroxide solution could be formed by adding sodium hydroxide to a solution of calcium chloride. The patent also states that during the practice of the process the sand particles in the formation become coated with calcium silicates of unknown or indefinite composition, and proposes that the coating cements the individual grains together and increases the structural strength of the sand assemblage.

Yet another approach has been described in two companion cases (U.S. Pat. Nos. 5,088,555 and 5,101,901). In U.S. Pat. No. 5,088,555, a sand consolidation method was described involving sequential injections of (a) an aqueous solution of an alkali metal silicate and (b) certain organic solutions of a calcium salt (e.g., calcium chloride hydrate or chelated calcium) through perforations in the casing of a borehole. The components of these two solutions are said to react to form a calcium silicate cement with permeability retention characteristics in the formation interval being treated that prevents sand from being produced during the production of hydrocarbon fluids from the well.

However, the use of a silicate-precipitating agent that is in solution may give rise to short gellation times upon contact silicates. Accordingly, there exists a need for consolidation or stabilization methods which allow for longer and/or controllable gellation times.

SUMMARY OF INVENTION

In one aspect, embodiments disclosed herein relate to a method for treating a subterranean formation penetrated by a wellbore that includes injecting an alkali silicate into the wellbore; injecting a solid micronized silicate-precipitating agent into the wellbore; and allowing the alkali silicate and the solid micronized silicate-precipitating agent to react to form a silicate gel.

In another aspect, embodiments disclosed herein relate to a method for treating a subterranean formation penetrated by a wellbore that includes injecting an alkali silicate into the wellbore; injecting a solid micronizing agent comprising at least one of sodium silicofluoride, magnesium carbonate, magnesium oxide, calcium sulfate into the wellbore; and allowing the alkali silicate and the solid micronized silicate-precipitating agent to react to form a silicate gel.

In yet another aspect, embodiments disclosed herein relate to a method for treating a subterranean formation penetrated by a wellbore that includes injecting an alkali silicate into the wellbore; injecting a solid micronized silicate-precipitating agent comprising a hydrolysable or biodegradable ester into the wellbore; and allowing the alkali silicate and the solid micronized silicate-precipitating agent to react to form a silicate gel.

Other aspects and advantages of the invention will be apparent from the following description and the appended claims.

DETAILED DESCRIPTION

In one aspect, embodiments disclosed herein relate to silicate gels formed from the reaction of alkali silicates and solid silicate-precipitating agents and their use in the stabilization of a subterranean formation.

Silica Gel

The silica gel may be formed through reaction of an alkali silicate and a silicate precipitating agent. When injected in a wellbore, the reactive components may permeate through weak or unconsolidated regions of a formation, and react therein to form a silicate gel.

Emplacement of the various components to form the silica gels of the present disclosure may vary. For example, a slug or pill of the gel reagents may be "spotted" as known by one of ordinary skill in zone or region of interest. In various embodiments, the alkali silicate and silicate-precipitating agent may be emplaced sequentially (in either order) in a multi-stage treatment or simultaneously in a single stage treatment. The emplacement order may depend, for example, on the depth and breadth of the unconsolidated zone to be stabilized, the particular components selected, and gellation time for the particular components. In one embodiment, an alkali silicate may be initially injected, followed by the injection of a silicate-precipitating agent. In another embodiment, a silicate-precipitating agent may be initially injected, followed by the injection of an alkali silicate. In yet another embodiment, an alkali silicate and a silicate precipitating agent may be injected in a single pill.

The time required for the silicate to react with silicate precipitating agents may be a balancing of several factors in order to efficiently and effectively stabilize the particular unconsolidated formation. That is, the time for reaction of the silicate, the precipitating agents, and the surrounding formation particles to significantly increase the stability of the earth formation may be sufficiently short so as to be useful to the driller and allow the continuation of drilling of a wellbore. Additionally, the time for reaction may be sufficiently long enough that the silicate and the silicate precipitating agents are able to permeate through the unconsolidated or weakly consolidated region of the formation for effective stabilization. One of ordinary skill in the art would recognize that by varying the reagent components and emplacement order, the gellation time may be varied from several minutes to 20 hours or more.

Alkali Silicates

Alkali silicates that may be used to form silica gels according to the present disclosure may include at least one of sodium silicate and potassium silicate, for example. Alkali silicates may be formed by combining silicon dioxide with an alkali source such as alkali oxides, carbonates, and/or hydroxides. Depending on the particular application, one of ordinary skill in the art would recognize that the alkali silicate may be tailored to be supplied in solution or dry form, and have tailored solids content, viscosity, and particle size depending on its form and ratio of silicon dioxide to alkali oxide. In one embodiment, the ratio of silicon dioxide to alkali oxide may range from 1.6 to 3.3 and from 2.5 to 3.2 in another embodiment. In another embodiment, the amount of alkali silicate present in the treatment pills of the present disclosure may range from about 10 to 60 percent by weight based on the total weight of the fluid in which the alkali silicate is carried.

Examples of commercially available silicates are listed below in Table 1.

TABLE 1

| PQ Corporation Product name | $SiO_2/K_2O$ | % $SiO_2$ | % $K_2O$ | % Solids | Density (20° C.) |
|---|---|---|---|---|---|
| Potassium Silicates | | | | | |
| KASIL ® 1 | 2.5 | 20.8 | 8.3 | 29.1 | 10.5 ppg |
| KASIL ® 6 | 2.1 | 26.5 | 12.65 | 39.15 | 11.5 ppg |
| KASIL ® 33 | 2.1 | 24.4 | 11.6 | 36.0 | 11.2 ppg |
| KASOLV ® 16 | 1.6 | 52.8 | 32.5 | 85.3 | 43.0 lb/ft$^3$ |
| KASIL ® 1624 | 1.65 | 15.0 | 9.1 | 24.1 | 10.16 ppg |
| KASIL ® 2130 | 2.1 | 20.0 | 9.5 | 29.5 | 10.6 ppg |
| KASIL ® 2135 | 2.18 | 24.0 | 11.0 | 35.0 | 11.15 ppg |
| KASIL ® 2.5 | 2.5 | 71.0 | 28.4 | 99.4 | 77.5 lb/ft$^3$ |
| KASIL ® SS | 2.5 | 71.0 | 28.4 | 99.4 | 57.4 lb/ft$^3$ |
| AGSIL ™ 25H | 2.5 | 60.65 | 24.25 | 84.9 | — |
| Sodium Silicates | | | | | |
| A ® 1647 | 1.6 | 28.8 | 18.0 | 46.8 | 13.40 ppg |
| A ® 1847 | 1.8 | 30.20 | 16.78 | 46.98 | 13.24 ppg |
| A ® 2445 | 2.4 | 32.2 | 13.4 | 45.6 | 12.8 ppg |

TABLE 1-continued

| PQ Corporation Product name | SiO₂/K₂O | % SiO₂ | % K₂O | % Solids | Density (20° C.) |
|---|---|---|---|---|---|
| A ® 2447 | 2.40 | 33.2 | 13.9 | 47.1 | 13.0 ppg |
| A ® 2645 | 2.58 | 32.1 | 12.5 | 44.6 | 12.63 ppg |
| BJ ™ 120 | 1.80 | 23.7 | 13.15 | 36.85 | 11.9 ppg |
| BW ™ 50 | 1.60 | 26.2 | 16.75 | 42.55 | 12.7 ppg |
| C ™ 50 | 2.0 | 36.00 | 18.00 | 54.0 | 14.1 ppg |
| D ™ | 2.00 | 29.4 | 14.7 | 44.1 | 12.8 ppg |
| E ™ | 3.22 | 27.7 | 8.6 | 36.3 | 11.5 ppg |
| K ® | 2.88 | 31.7 | 11.0 | 42.7 | 12.3 ppg |
| M ® | 2.58 | 32.1 | 12.4 | 44.5 | 12.6 ppg |
| N ® | 3.22 | 28.7 | 8.9 | 37.6 | 11.6 ppg |
| N ® 38 | 3.22 | 28.7 | 8.9 | 34.6 | 11.3 ppg |
| N ® Clear | 3.22 | 28.7 | 8.9 | 37.6 | 11.6 ppg |
| O ® | 3.22 | 29.5 | 9.1 | 38.6 | 11.8 ppg |
| OW ® | 3.22 | 29.46 | 9.15 | 38.61 | — |
| RU ™ | 2.40 | 33.0 | 13.9 | 47.1 | 13.0 ppg |
| SS ® | 3.22 | 75.7 | 23.5 | 99.2 | (11.8) ppg |
| SS ® 22 | 3.22 | 75.7 | 23.5 | 99.2 | 1.44 g/cm³ |
| SS ® 75 | 2.75 | 72.9 | 26.5 | 99.4 | (11.8) ppg |
| Star ™ | 2.50 | 26.5 | 10.6 | 37.1 | 11.7 ppg |
| Starso ® | 1.80 | 24.12 | 13.40 | 37.52 | 12.0 ppg |
| Stixso ™ RR | 3.25 | 30.0 | 9.2 | 39.2 | 11.8 ppg |
| V ™ | 2.50 | 26.5 | 10.6 | 37.1 | 11.7 ppg |

To reduce/prevent substantial gellation of the silicate prior to reaction with the precipitating agent, the fluid in which the silicate is carried and injected into the wellbore may have a pH in the alkaline range of about 9 to 13.

Silicate Precipitating Agent

As described above, alkali silicates may be converted to a silica gel by chemical conversion with the addition of a silicate precipitating agent to form the solid, insoluble bonds of the gel. The silicate precipitating agent according to the present disclosure may be a solid, micronized silicate precipitating agent. As used herein, "micronized" refers to a particle size of less than about 100 microns.

In various embodiments, the silicate precipitating agent may have an average particle size of less than about 50 microns, less than about 10 microns in other embodiments, and less than 1 micron is yet other embodiments. One of ordinary skill in the art would appreciate that depending on the type of formation into which the agents may need to permeate and any viscosity or rheology requirements for the fluid in which the agents are suspended, the particle size may be selected accordingly.

Use of silicate precipitating agents in solid form may allow for control of the reaction/gellation time for the formation of the silica gel. In a particular embodiment, the silicate precipitating agent may have a solubility of less than about 1 g/100 mL, and less than about 100 mg/100 mL is other embodiments. One of ordinary skill in the art would appreciate that the solubility of the silicate precipitating agent may be varied in accordance with a desired reaction time.

Suitable solid, micronized silicate precipitating agents may include at least one of calcium carbonate, zinc oxide, sodium silicofluoride, magnesium carbonate, magnesium oxide, calcium sulfate. However, one of ordinary skill in the art would appreciate that the silicate precipitating agent may include any partially soluble salt of a polyvalent metal cation that reacts to forms an insoluble silicate.

In some embodiments, the solid, micronized silicate precipitating agent may include any solid, biodegradable ester or material that degrades to lower the pH of the surrounding environment. For example, suitable solid, micronized silicate precipitating agents may include at least one hydrolysable ester having a solubility of less than 1 g/100 mL. In other embodiments, the solid, micronized precipitating agent may include at least one ester of at least one of gallic acid, citric acid, fumaric acid, and succinic acid. In a particular embodiment, the solid, micronized precipitating agent includes at least one C2-C12 alkyl ester of gallate. In other embodiments, the solid, micronized silicate precipitating agent may include other types of solid, biodegradable ester or material that degrades to lower the pH, such as, for example, polylactic acid, polyglycolic acid, and starch esters.

In various embodiments, the amount of silicate precipitating agent present in the treatment pills of the present disclosure may range from about 10 to 60 percent by weight based on the total weight of the fluid in which the silicate precipitating agent is carried.

Fluid Formulations

The silicates and silicate-precipitating agents may be incorporated individually or in combination with a base or carrier fluid for injection into the wellbore. In various embodiments, the base fluid may be selected from a water-based fluid and an oil-based fluid.

Water-based fluids may have an aqueous fluid as the base solvent into which silicates and/or silicate-precipitating agents may be incorporated. The aqueous fluid may include at least one of fresh water, sea water, brine containing organic and/or inorganic dissolved salts, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation).

In other embodiments, the silicates and/or silicate-precipitating agents of the present disclosure may be incorporated into an oil-based fluid. In one embodiment, the wellbore carrier fluids may include invert emulsion having an oleaginous continuous phase, a non-oleaginous discontinuous phase, and a silicate additive and/or a silicate-precipitating agent. Alternatively, for alkali silicates used in solution, an oleaginous fluid may be used to emulsify the silicate therein or an oleaginous fluid may be emulsified within the silicate phase. The use of the silicate emulsified in an oleaginous fluid may be desirable if a slower reaction with the silicate precipitating agent is desired. The use of the oleaginous phase emulsified in a silicate solution may be selected when a lower density is desired.

The oleaginous fluid may be a liquid and more preferably is a natural or synthetic oil and more preferably the oleaginous fluid is selected from the group including diesel oil; mineral oil; a synthetic oil, such as polyolefins, polydiorganosiloxanes, siloxanes or organosiloxanes; and mixtures thereof. When forming an invert emulsion, the concentration of the oleaginous fluid should be sufficient so that an invert emulsion forms and may be less than about 99% by volume of the invert emulsion. In one embodiment the amount of oleaginous fluid is from about 30% to about 95% by volume and more preferably about 40% to about 90% by volume of the invert emulsion fluid. The oleaginous fluid in one embodiment may include at least 5% by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and preferably is an aqueous liquid. More preferably, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus in one embodiment the amount of non-oleaginous fluid is less that about 70% by volume and preferably from about 1% to about 70% by volume. In another embodiment, the non-oleaginous fluid is preferably from about 5% to about 60% by volume of the invert emulsion fluid.

Other additives that may be included in the fluids formulations disclosed herein may include, for example, wetting agents, organophilic clays, viscosifiers, fluid loss control agents, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Advantageously, embodiments of the present disclosure may provide for treatment fluids or pills that may be used to stabilize unconsolidated or weakly consolidated regions of a formation. Using solid or particulate silicate precipitating agents may allow for a slower reaction or gellation time between the silicate and the silicate precipitating agents. A slower reaction time may allow the gel components, the silicate and the silicate precipitating agent, to more fully permeate the unconsolidated formation prior to gellation. Additionally, by providing silicate precipitating agent as a solid particulate matter on a micron or sub-micron scale, the silicate precipitating agent may experience less hindrance in permeating the formation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for treating a subterranean formation penetrated by a wellbore, comprising:
   injecting an alkali silicate into the wellbore;
   injecting a solid micronized silicate-precipitating agent comprising a hydrolysable or biodegradable ester into the wellbore; and
   allowing the alkali silicate and the solid micronized silicate-precipitating agent to react to form a silicate gel.

2. The method of claim 1, wherein the formation comprises an unconsolidated or weakly consolidated zone.

3. The method of claim 2, wherein the silicate gel is formed in the unconsolidated or weakly consolidated zone of the formation.

4. The method of claim 1, wherein the alkali silicate is selected from the group consisting of sodium silicate, potassium silicate, and combinations thereof.

5. The method of claim 1, wherein the hydrolysable or biodegradable ester is selected from the group consisting of an alkyl ester of gallic acid, a derivative of polylactic acid, a derivative of polyglycolic acid, starch esters, and combinations thereof.

* * * * *